US006819699B1

(12) United States Patent
Enami et al.

(10) Patent No.: US 6,819,699 B1
(45) Date of Patent: Nov. 16, 2004

(54) ARF EXCIMER LASER DEVICE, SCANNING TYPE EXPOSURE DEVICE AND ULTRAVIOLET LASER DEVICE

(75) Inventors: Tatsuo Enami, Yokohama (JP); Osamu Wakabayashi, Hiratsuka (JP); Katsutomo Terashima, Oyama (JP); Kiwamu Takehisa, Yokohama (JP); Tsukasa Hori, Hiratsuka (JP); Hakaru Mizoguchi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/518,639

(22) Filed: Mar. 3, 2000

(30) Foreign Application Priority Data

Mar. 5, 1999 (JP) ........................................... 11-058004
Jun. 15, 1999 (JP) ........................................... 11-167999

(51) Int. Cl.[7] .............................................. H01S 3/22
(52) U.S. Cl. ............................. 372/57; 372/55; 372/58; 372/90
(58) Field of Search ............................. 372/57, 55, 58, 372/59

(56) References Cited

U.S. PATENT DOCUMENTS

| | | | | |
|---|---|---|---|---|
| 4,331,937 A | * | 5/1982 | Brown et al. ................... | 372/74 |
| 4,611,327 A | * | 9/1986 | Clark et al. ..................... | 372/58 |
| 4,817,096 A | * | 3/1989 | Nighan et al. .................. | 372/5 |
| 5,073,896 A | * | 12/1991 | Reid et al. ...................... | 372/59 |
| 5,090,020 A | * | 2/1992 | Bedwell ........................ | 372/59 |
| 5,187,716 A | * | 2/1993 | Haruta et al. ................... | 372/57 |
| 6,014,398 A | * | 1/2000 | Hofmann et al. .............. | 372/60 |
| 6,018,537 A | * | 1/2000 | Hofmann et al. .............. | 372/25 |
| 6,188,710 B1 | * | 2/2001 | Besaucele et al. ............. | 372/60 |

FOREIGN PATENT DOCUMENTS

JP    2000294856    10/2000

OTHER PUBLICATIONS

Electronic Materials, Mar. 1995, pp. 107–111.
The Laser Society of Japan, RTM–98–31–36, pp. 29–34.
Toshihiko Ishiara & Igor Fomenkov, Excimer laser design for step–and–scan exposure tools, in Microlithography World, Winter 1997, pp. 21, 22, 24 and 25.
Kazuaki Suzuki, Shinji Wakamoto & Kenji Nishi, KrF step and scan exposure system using higher N.A. projection lens, in SPIE, vol. 2726, pp. 767–779.

* cited by examiner

Primary Examiner—Don Wong
Assistant Examiner—Dung Nguyen
(74) Attorney, Agent, or Firm—Varndell & Varndell, PLLC

(57) ABSTRACT

A buffer gas contained in a laser gas used for an ArF excimer laser mainly consists of He, and Xe is preferably added to the laser gas. Mixture piping divided by valves is disposed on piping running from a chamber to an excimer laser gas cylinder, the mixture piping and a Xe gas cylinder are connected, gas exhaust by a gas exhaust module and opening and closing of the valves are controlled by a gas controller to add a trace quantity of xenon gas to the excimer laser gas. Thus, to remedy a burst characteristic and a spike characteristic of the ultraviolet laser device by adding a trace quantity of xenon gas, the xenon gas can be supplied efficiently into the chamber without modifying existing laser gas supply equipment.

6 Claims, 7 Drawing Sheets

ARF EXCIMER LASER DEVICE, SCANNING TYPE EXPOSURE DEVICE AND ULTRAVIOLET LASER DEVICE

BACKGROUND OF THE INVENTION

1. Field of the Invention

The present invention relates to an ArF excimer laser and a scanning type exposure device. And, the invention also relates to an ultraviolet laser device which oscillates pulsed laser by adding a trace quantity of xenon gas to the gas for the ultraviolet laser introduced into a chamber and exciting the gas for the ultraviolet laser by the pulse oscillation in this chamber, and particularly to an ultraviolet laser device which efficiently supplies the xenon gas into the chamber without modifying an existing laser gas supply equipment.

2. Description of the Related Art

It is conventionally known that the ArF excimer laser uses argon (Ar) and fluorine ($F_2$) as a laser gas for a light source of the exposure device which performs exposure of semiconductors. FIG. 7 shows a cross sectional view of the structure of ArF excimer laser 1 according to prior art. The ArF excimer laser 1 of FIG. 7 has laser chamber 2 in which laser gas is sealed and an electric discharge is caused to oscillate laser light 11 and narrow-banding unit 10 for narrow-banding (precisely controlling a spectrum width and a center wavelength) the laser light 11 oscillated by the laser chamber 2.

$F_2$, Ar and neon (Ne) are enclosed as the laser gas at a predetermined pressure ratio in the laser chamber 2. Among them, Ne is a buffer gas occupying about 98% or more of the total volume of the laser gas.

The chamber 2 has therein flowing fan 19 which is rotated by motor 20 therein to circulate the laser gas in the chamber 2 so to guide to between discharging electrodes 5 and 5. And, a high voltage is applied to between the discharging electrodes 5 and 5 from high-voltage power supply 18 to excite the laser gas by the electric discharge so to oscillate the laser light 11 having a wavelength of about 193 nm.

The oscillated laser light 11 is narrow-banded in the narrow-banding unit 10 disposed outside of the back of the laser chamber 2 and entered a step and repeat exposure device 15 (hereinafter called the stepper) to serve as a light source to expose semiconductor chips.

Generally, in the ArF excimer laser 1 of the above type, a high voltage is applied in a pulsed pattern to perform pulse oscillation of the laser light 11. Concerning the pulse oscillation, output per pulse is determined as pulse output, and an oscillation frequency of the laser light 11 is determined as a pulse frequency.

Excitation of the laser gas by an electric discharge undergoes the following process. Specifically, the buffer gas to which energy was given by the electric discharge collides with the molecules of $F_2$ and Ar to give energy to $F_2$ and Ar so to produce ArF excimer molecules. The energy of the ArF excimer molecules is discharged to cause the laser oscillation.

In the KrF excimer laser, helium (He) had been used for the buffer gas before. But, it came to be known that when Ne was used as the buffer gas, efficiency to give energy to the molecule of $F_2$ and Ar was higher as compared with the use of He, and the pulse output was increased. Therefore, Ne was originally used as the buffer gas in the ArF excimer laser 1.

FIG. 8 shows an explanatory diagram of the stepper 15. In FIG. 8, the stepper 15 has reticle 38 (mask for exposure) which is an expansion original plate of an IC circuit, wafer stage 43 which has thereon wafer 41 for producing semiconductor chips and is freely movable in X and Y directions in the drawing, lighting lenses 37 for irradiating the laser light 11 to the reticle 38, and projection lens 39 which gathers the laser light 11, which has passed through the pattern of the reticle 38, to irradiate it to the semiconductor chips on the wafer 41.

The laser light 11 having entered the stepper 15 is shaped by the lighting lenses 37 and irradiated to substantially the entire surface of the reticle 38. The laser light 11 having passed through the reticle 38 is irradiated to the entire area of one of the semiconductor chips for a fixed number of pulses through the projection lens 39 to perform the exposure of the semiconductor chip by one operation. After completing the exposure of one semiconductor chip, the wafer stage 43 is moved to perform the exposure of the next semiconductor chip.

But, the aforesaid prior art has the following disadvantages.

The number of semiconductor chips that the stepper 15 can expose in each unit time (hereinafter called the stepper capability) increases as the power (product of pulsed output and pulse frequency) of the laser light 11 increases. In other words, time required for irradiating one semiconductor chip is shortened by increasing the pulse output.

However, there is a problem that a current-carrying capacity of the high voltage power supply 18 must be made large to increase the pulse output, resulting in upsizing the ArF excimer laser 1.

Moreover, it is necessary to increase a flow velocity of the laser gas which flows between the discharging electrodes 5 and 5 to raise the pulse frequency. It is because a trouble is caused in excitation of the laser gas and the pulse output is lowered greatly if the laser gas deteriorated by a pulse discharge is not removed from between the discharging electrodes 5 and 5 before the next pulse discharge.

However, there is also a problem that the ArF excimer laser 1 is upsized because it is necessary to enlarge the flowing fan 19 to increase a flow rate of the laser gas and to enlarge the motor 20 so to raise the number of rotations.

Now, the ultraviolet laser device used for conventional exposure of semiconductors will be described.

Conventionally, a semiconductor exposure device having the ultraviolet laser device, such as an excimer laser device, as a light source repeats exposure and stage movement alternately to make exposure of IC chips on a semiconductor wafer. Therefore, the ultraviolet laser device performs a burst operation to repeat a continuous pulse oscillation operation which continuously causes a pulse oscillation of the laser light for a given number of times and a pause of the oscillation to pause the pulse oscillation for a predetermined duration.

But, when the burst operation is performed, a burst characteristic and a spike characteristic that energy is gradually lowered are caused, and the laser output from the excimer laser device has a change in energy at every burst. As a result, there is a disadvantage that an amount of light exposure is variable.

Therefore, the applicant for the present invention has proposed a technique to improve variations in the amount of light exposure due to the burst characteristic and the spike characteristic by adding a trace quantity of xenon gas to the gas for ultraviolet laser in the chamber in Japanese Patent Application No. 11-23709.

This art is not effective because it is necessary that a xenon gas cylinder for supplying xenon gas into the chamber is separately disposed from a gas cylinder for the ultraviolet laser and the xenon gas is fed into the chamber three passage quite different from a passage for feeding the gas for ultraviolet laser.

Especially, since a site where the excimer laser is set up is provided with only the laser gas supply equipment such as a gas cylinder for the ultraviolet laser inherently required, it is not efficient to modify such equipment only to supply the xenon gas into the chamber.

Accordingly, in order to remedy the burst characteristic and the spike characteristic of the ultraviolet laser device by adding a trace quantity of xenon gas, it is quite significant to efficiently supply the xenon gas into the chamber without modifying the existing laser gas supply equipment.

SUMMARY OF THE INVENTION

The present invention was completed in view of the above-mentioned problems. And, it is a first object of the invention to provide ArF excimer laser capable of raising a pulse frequency without involving the enlargement of the device and an exposure device which has the ArF excimer laser of a high pulse frequency as the source of light.

To solve the above disadvantages and to remedy the burst characteristic and the spike characteristic of the ultraviolet laser device by adding a trace quantity of xenon gas, it is a second object of the present invention to provide an ultraviolet laser device which can efficiently supply xenon gas into the chamber without modifying the existing laser gas supply equipment.

To achieve the aforesaid first object, a first aspect of the invention is an ArF excimer laser which causes an electric discharge between discharging electrodes to excite a laser gas and oscillates a narrow-banded laser light, wherein a buffer gas contained in the laser gas mainly consists of He.

According to the first aspect of the invention, the buffer gas for the ArF excimer laser mainly consists of He. Compared with Ne conventionally used as the buffer gas, He has a density of about 1/5, the gas flow velocity between the discharging electrodes becomes 2.2 times the conventional one by using He as the buffer gas because the gas flow velocity of the flowing fan 19 is in inverse proportion to the square root of the density of the gas. Thus, the laser light having a high pulse frequency can be obtained because even if the pulse frequency is increased, the laser gas deteriorated between the discharging electrodes by the electric discharge is completely removed before the next electric discharge is performed. At this time, the effect of increasing the pulse frequency is high, and the ability of the exposure device can be increased though the laser power decreases slightly.

And, the laser system need not be enlarged because the flow velocity between the discharging electrodes can be increased without enlarging neither the flowing fan nor the motor.

According to a second aspect of the invention, the ArF excimer laser described in the first aspect of the invention has Xe contained in the laser gas.

According to the second aspect of the invention, the ArF excimer laser having He as the buffer gas contains Xe in the laser gas.

There is an effect that the pulse output is increased by adding Xe to the laser gas. Besides, the addition of Xe provides an effect of easing deviations of the pulse output, and stabilized high laser power can be obtained.

And, the laser light with a high pulse frequency can be obtained without enlarging the device as described in the effect of the first aspect of the invention because He is used as the buffer gas.

Accordingly, the ability of the exposure device is enhanced, and exposure can be performed excellently.

A third aspect of the invention is a scanning type exposure device which performs exposure of an entire semiconductor chip on a wafer by moving the wafer while irradiating a pulsed laser light to each of a plurality of irradiation regions smaller than an area of the semiconductor chip, wherein a light source for oscillating the laser light is the ArF excimer laser described in the first or second aspect of the invention.

According to the third aspect of the invention, the ArF excimer laser having He as the buffer gas is used as the light source for the scanning type exposure device which performs the exposure of a single semiconductor chip by dividing it into a plurality of irradiation regions to expose the individual irradiation regions.

To perform the exposure by the scanning type exposure device, it is necessary to have the pulse output within a predetermined range to control the irregularity of the exposure due to deviations of the pulse output of the ArF excimer laser and to irradiate a predetermined number or more of laser pulses to each of the radiation regions. Therefore, this scanning type exposure device cannot increase the pulse output to decrease the number of irradiation pulses for each semiconductor chip as does the stepper and needs to increase the pulse frequency of the laser light in order to improve the exposure capacity per unit time.

The above scanning type exposure device can have high exposing capacity by using the ArF excimer laser of a high pulse frequency described in the first or second aspects of the invention as the light source for the laser light.

Besides, the pulse output of the laser light can have an improved stability to enable good exposure by using the ArF excimer laser having Xe added as the light source as described in the second aspect of the invention.

The scanning type exposure device irradiates the laser light to the irradiation region smaller than one semiconductor chip and therefore does not need a large projection lens as does the stepper. And it is desirable to produce a semiconductor chip having a large area.

To achieve the above second object, the ultraviolet laser device according to the fourth aspect of the invention is an ultraviolet laser device for oscillating pulsed laser by adding a trace quantity of xenon gas to gas for ultraviolet laser introduced into a chamber, and causing pulse oscillation in the chamber so as to excite the gas for ultraviolet laser to oscillate the pulsed laser, comprising: a xenon gas cylinder in which xenon gas is sealed; an ultraviolet laser gas cylinder in which the gas for ultraviolet laser is sealed; and ultraviolet laser gas supply piping for connecting the ultraviolet laser gas cylinder and the chamber, wherein a predetermined position of the ultraviolet laser gas supply piping and the xenon gas cylinder are connected by xenon gas piping.

The invention produces an effect that xenon gas can be fed into the chamber readily without modifying the existing laser gas supply equipment because it is configured to connect the xenon gas cylinder with the given point on the piping for supplying the gas for the ultraviolet laser, which connects the gas cylinder for the ultraviolet laser and the chamber, by the xenon gas piping. The added xenon gas is entered piping having a trace quantity, and a pressure gauge is used to measure the xenon gas, so that the xenon gas can be added to the laser gas easily and accurately. When the xenon gas cylinder is positioned in the neighborhood of the chamber, the chamber and the xenon gas cylinder can be changed simultaneously by closing a valve and removing a piping joint. Thus, a possibility that the impurity gas of the atmosphere etc. is introduced into the xenon measuring piping is decreased.

The ultraviolet laser device according to the fifth aspect of the invention is characterized in that a first valve and a second valve are disposed on the ultraviolet laser gas supply piping, a third valve is disposed on mixture piping formed by the first valve, the second valve and piping therebetween, and the third valve and the xenon gas cylinder are connected by the xenon gas piping.

According to the invention, the third valve is disposed on the mixture piping consisting of the first valve, the second valve and the piping between them, and the third valve and the xenon gas cylinder are connected by the xenon gas piping, so that the invention provides an effect that the xenon gas or the ultraviolet laser gas can be introduced easily into the chamber by merely opening and closing the first to third valves.

The ultraviolet laser device according to the sixth aspect of the invention is characterized in that the chamber is exhausted in a state that the second valve located on the mixture piping on the side of the ultraviolet laser gas cylinder and the third valve are closed, and the first valve located on the mixture piping on the side of the chamber is opened, thereafter the xenon gas is supplied into the mixture piping by closing the first valve and opening the third valve, and when it is measured that a gas pressure in the mixture piping has reached a predetermined gas pressure, the third valve is closed, and the first valve and the second valve are opened.

The invention closes the second valve and the third valve located on the mixture piping on the side of the ultraviolet laser gas cylinder, exhausts the chamber with the first valve located on the mixture piping on the side of the chamber opened, closes the first valve and opens the third valve to supply the xenon gas into the mixture piping, and when it is measured that the gas pressure in the mixture piping has become the predetermined gas pressure, closes the third valve and opens the first valve and the second valve. Thus, the invention produces an effect that the xenon gas or the ultraviolet laser gas can be introduced into the chamber with much ease by virtue of the vacuum of the chamber and the opening and closing of the first to third valves.

DESCRIPTION OF THE PREFERRED EMBODIMENTS

Figure 1:
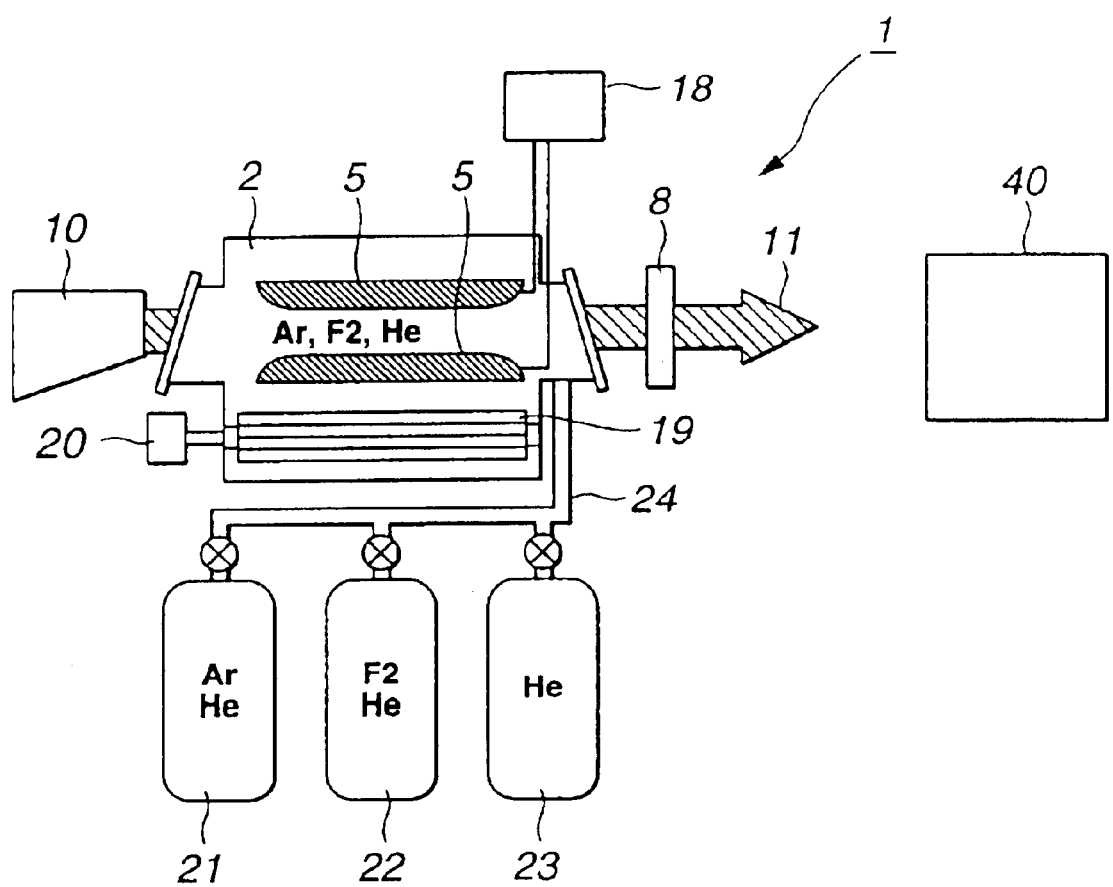
FIG. 1 is an explanatory diagram of the ArF excimer laser according to a first embodiment.

Embodiments to which the present invention pertains will be described in detail with reference to the accompanying drawings. In the following respective embodiments, like reference numerals are used for like elements or components as in the drawing used to described the prior art and the drawing used to describe the embodiment before the embodiment of the prior art, and overlapped descriptions will be omitted.

FIG. 1 shows a sectional view of the structure of ArF excimer laser 1 (hereinafter abbreviated as the ArF excimer laser 1) related to a first embodiment of the present invention. In FIG. 1, the ArF excimer laser 1 has laser chamber 2 which encloses a laser gas and causes an electric discharge to oscillate laser light 11, and narrow-banding unit 10 which performs narrow-banding of the laser light 11 oscillated from the laser chamber 2.

The laser chamber 2 is connected with rare gas cylinder 21 which contains Ar diluted with He, halogen cylinder 22 which contains $F_2$ diluted with He and buffer cylinder 23 which contains He through piping 24.

At the time of the laser oscillation, these $F_2$, Ar and He are enclosed in the laser chamber 2 at a predetermined pressure ratio as the laser gas. And He occupies about 98% or more of the entire volume of the laser gas.

A pair of discharging electrodes 5, 5 are disposed at a predetermined positions in the laser chamber 2. Flowing fan 19 to be rotated by motor 20 is also disposed within the chamber 2 to circulate the laser gas therein to guide it to between the discharging electrodes 5 and 5. Then, a high voltage is applied from high-voltage power supply 18 to between the discharging electrodes 5 and 5 to excite the laser gas by the electric discharge so to oscillate the laser light 11 having a wavelength of about 193 nm.

The laser light 11 which is pulse-oscillated by the electric discharge within the laser chamber 2 is entered and narrow-banded in the narrow-banding unit 10 disposed outside of the back of the laser chamber 2. And, the laser light 11 coming out of front mirror 8 through windows 7 and 9 enters exposure device 40 so to be a light source for exposure of wafer 41.

Figure 2:
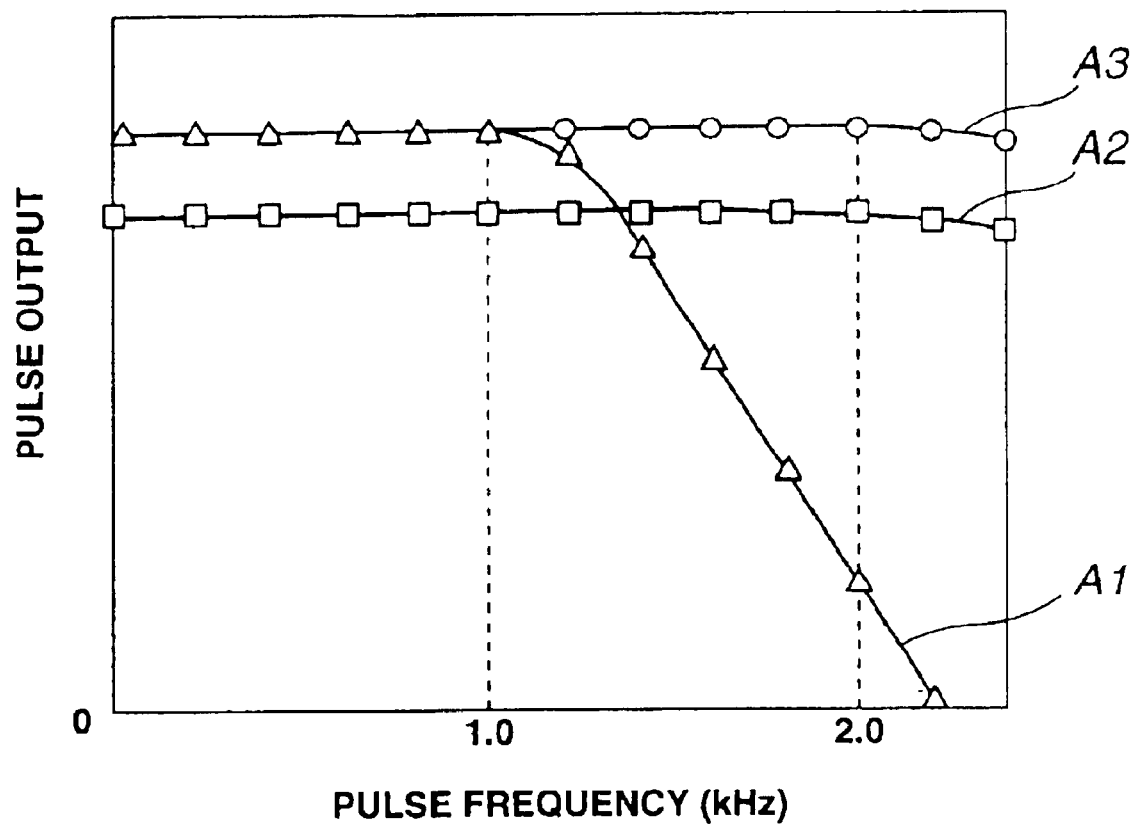
FIG. 2 is a graph showing a relationship between a buffer gas and output characteristics.

FIG. 2 shows a relationship between the buffer gas and output characteristics of the ArF excimer laser 1 with the flowing fan 19 made to have a fixed number of rotations. In FIG. 2, pulse output of the laser light 11 is indicated along the vertical axis and a pulse frequency along the horizontal axis. And, A1 indicates a curve of a conventional buffer gas using Ne, and A2 indicates a curve of the buffer gas using He of this embodiment.

As shown in FIG. 2, when the pulse frequency is 1 kHz or below, the conventional ArF excimer laser 1 (hereinafter called the Ne buffer ArF excimer laser 1) having Ne as the buffer gas has higher pulse output as compared with the ArF excimer laser 1 having He as the buffer gas (hereinafter called the He buffer ArF excimer laser 1). But, when the pulse frequency is higher than 1 kHz, the pulse output of the Ne buffer ArF excimer laser 1 lowers with the increase of the pulse frequency, while the pulse output of the He buffer ArF excimer laser 1 does not change substantially.

Reasons for this are considered as follows. Specifically, the laser gas has the buffer gas for its 98% or more in a volume ratio, so that the laser gas has a gas density substantially corresponding to that of the buffer gas. Therefore, the laser gas has a density of about ⅕ by using He (density:

0.1785 kg/m3) as the buffer gas as compared with the use of Ne (density: 0.900 kg/m3) as the buffer gas.

At this time, the laser gas has a flowing velocity of about 2.2 times by using He as the buffer gas because the gas flow velocity of the flowing fan 19 is in inverse proportion to a square root of the density of the gas. Therefore, the deteriorated laser gas is promptly removed from between the discharging electrodes 5 and 5 even if the pulse frequency is raised, and the pulse output is not lowered. In other words, the ArF excimer laser 1 which oscillates in a high pulse frequency of 1 kHz or more can be obtained by using He as the buffer gas.

As described above, the ArF excimer laser 1 of this embodiment uses He as the buffer gas. The flow velocity between the discharging electrodes 5 and 5 is increased to 2.2 times because the density of He is about ⅕ as compared with Ne conventionally used as the buffer gas. Therefore, the laser gas deteriorated by the electric discharge between the discharging electrodes 5 and 5 can be removed completely even if the pulse frequency is increased, and the pulse output is not lowered.

Moreover, a high flow velocity can be obtained between the discharging electrodes 5 and 5 without upsizing the flowing fan 19 or the motor 20. Therefore, the performance of the stepper 15 can be improved.

Recently, the increase of the area of the semiconductor chip as well as a greater semiconductor density are demanded. But, since the stepper performs the exposure of the entire area of the semiconductor chip by one operation, the projection lens 39 must be made to have a large area in order to perform the exposure of the semiconductor chip having a large area. But, the projection lens 39 for the laser light 11 of ultraviolet rays (193 nm) is limited its usable materials and very expensive. And, it is difficult technically to manufacture the projection lens 39 having a less aberration over its large area.

Therefore, the scanning type exposure device is attracting attention as an exposure device having the ArF excimer laser 1 as the light source. The scanning type exposure device of this type is described in detail in Electronic Material, March 1995, pp. 107 to 111, for example.

Figures 3, 4:
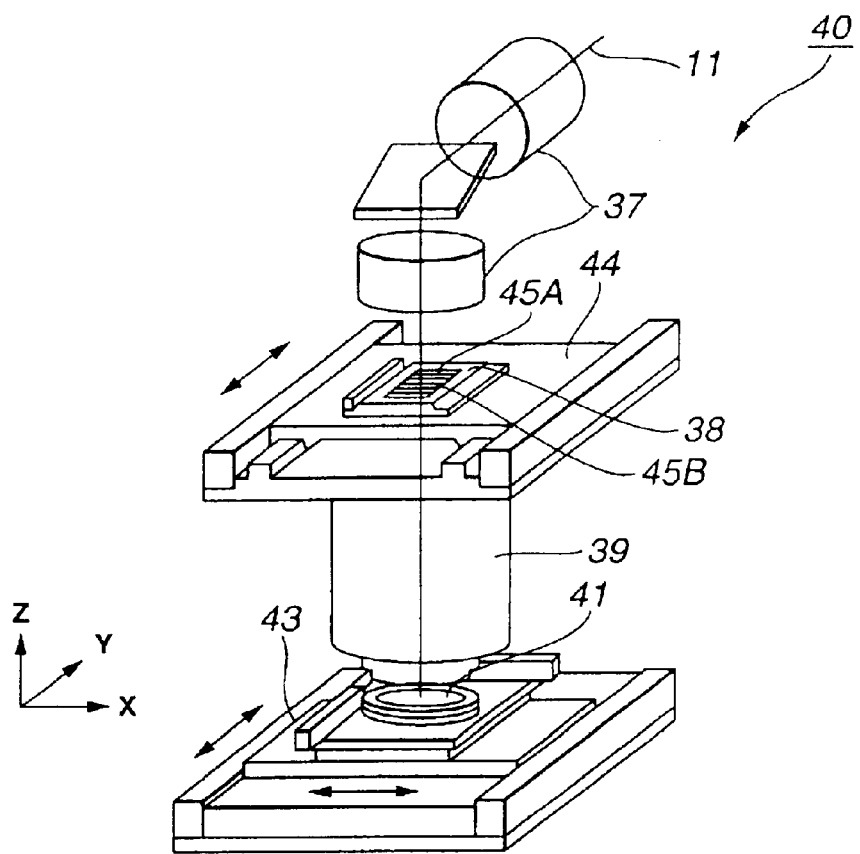
FIG. 3 is an explanatory diagram of a scanning type exposure device.
FIG. 4 is an enlarged view of a wafer.

FIG. 3 shows an explanatory diagram of the scanning type exposure device 40. In FIG. 3, the entered laser light 11 is shaped into an approximately rectangular form by the lighting lenses 37 and irradiated to first reticle area 45A of the reticle 38 mounted on reticle stage 44 which is freely movable in Y direction in the drawing.

FIG. 4 shows an enlarged diagram of the wafer 41. The laser light 11 having passed through the first reticle area 45A is irradiated to first irradiation region 46A of first chip 42A on the wafer 41 placed on wafer stage 43 which is freely movable in X and Y directions in the drawing.

When the laser light 11 is irradiated in for example n1 pulses (tens of pulses to several hundreds of pulses) and the exposure of the first irradiation region 46A is completed, the reticle stage 44 and the wafer stage 43 are moved by a predetermined width in the Y direction in FIG. 2. Then, the laser light 11 having the approximately rectangular shape is irradiated to second reticle area 45 next to the first reticle area 45A on the reticle 38. The laser light 11 having passed through the second reticle area 45B is irradiated in for example n2 pulses to second irradiation region 46B next to the first irradiation region 46A of the first chip 42A to perform the exposure of the second irradiation region 46B.

The scanning type exposure device 40 performs the exposure of small irradiation regions 46 one by one of the semiconductor chip 42 from its edge, so that the projection lens 39 is not required to have a large size. And, after completing the exposure of one semiconductor chip 42, the reticle stage 44 and the wafer stage 43 are moved, and the exposure of the neighboring semiconductor chip 42 is performed.

In actual processing, the irradiation region 46 and the next irradiation region 46 are not completely separately exposed but exposed while they are partly exposed simultaneously.

But, individual pulse output of the ArF excimer laser 1 is considerably variable in magnitude. Therefore, when the ArF excimer laser 1 is used as the light source for the scanning type exposure device 40, it is always necessary to irradiate the laser light 11 of a predetermined number or more of pulses to perform the exposure of one irradiation region 46. In other words, the scanning type exposure device 40 is hard to decrease the number of irradiation pulses to each semiconductor chip by increasing the pulse output as does the stepper.

Therefore, it is necessary to raise the pulse frequency of the laser light to shorten the duration for irradiating the laser light 11 in order to increase the number of semiconductor chips 42 which can be exposed in each unit time (hereafter called the scanning ability). In other words, the scanning ability of the scanning type exposure device 40 can be improved by using the ArF excimer laser 1, which uses He as the buffer gas as described above, as a source of light.

Figure 5:
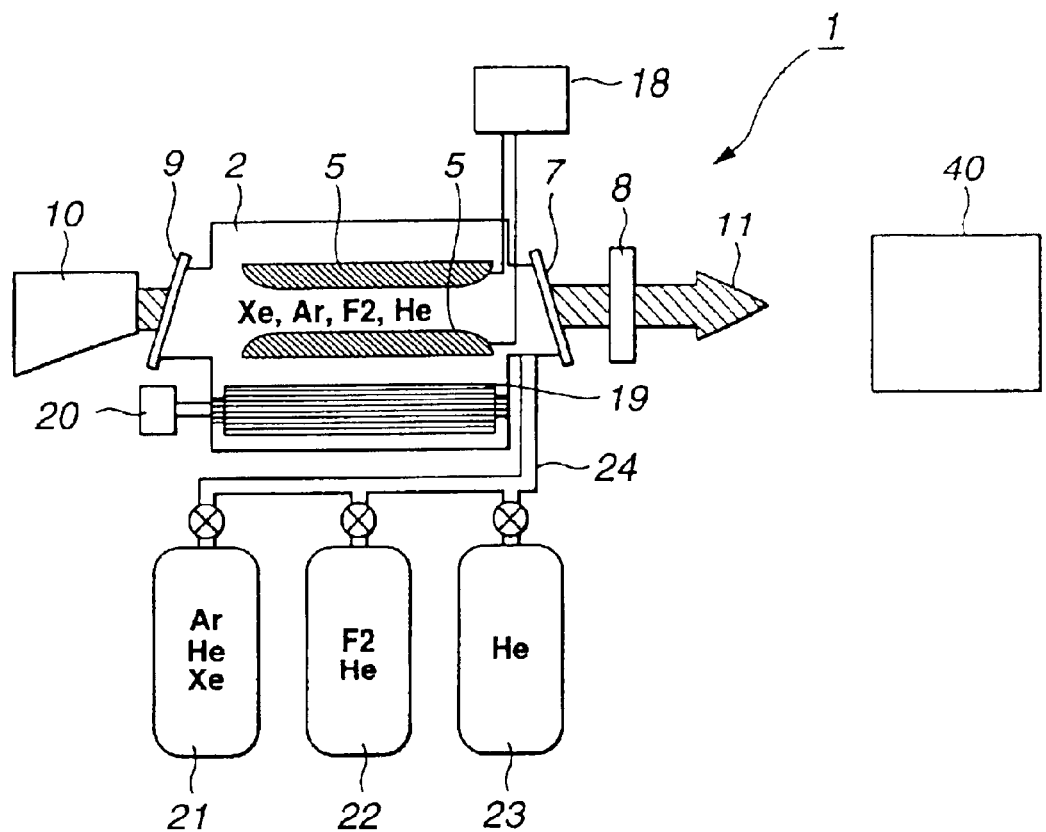
FIG. 5 is an explanatory diagram of the ArF excimer laser according to a second embodiment.

Now, a second embodiment will be described. FIG. 5 is a sectional diagram of the structure of the ArF excimer laser 1 of the second embodiment. In FIG. 5, the laser chamber 2 of the ArF excimer laser 1 is connected with rare gas cylinder 21 which contains Ar and xenon (Xe) diluted with He, halogen cylinder 22 which contains $F_2$ diluted with He and buffer cylinder 23 which contains He as the buffer gas through piping 24.

These $F_2$. Ar, He and Xe are enclosed at a predetermined pressure ratio as the laser gas in the laser chamber 2. And Xe desirably has a density of about 1 to 100 ppm.

In FIG. 2 described above, A3 indicates a curve having He as the buffer gas with Xe added in this embodiment.

As shown in FIG. 2, it is seen that the same pulse output as the Ne buffer ArF excimer laser 1 at a frequency of 1 kHz or less is obtained by adding Xe to the laser gas of the He buffer ArF excimer laser 1, and the pulse output is not lowered even if the frequency becomes 1 kHz or higher.

The reason for this is considered that the ultraviolet irradiation, which is called a preionization, performed immediately before the electric discharge between the discharging electrodes 5 and 5 is efficiently conducted by adding xe.

As described above, by adding Xe to the laser gas of the ArF excimer laser which uses He as the buffer gas according to this embodiment, the pulse output is not lowered, and the laser light 11 having a high frequency can be obtained. In addition, the same motor 20 and flowing fan 19 as prior art can be used, and it is not necessary to upsize the laser device.

Besides, the addition of Xe has an effect of easing variations of the pulse output (not shown), and it is possible to obtain stable laser output.

Figure 6:
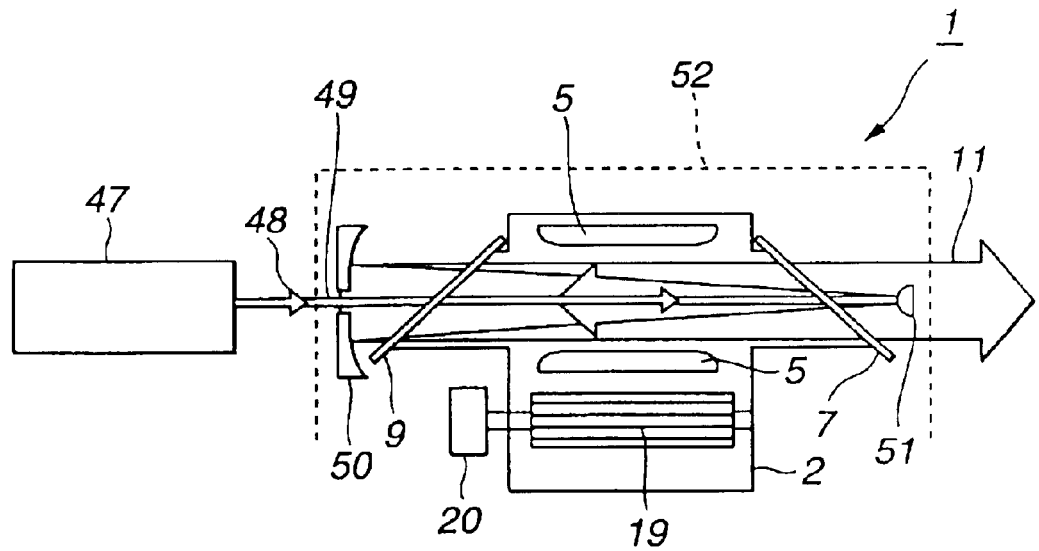
FIG. 6 is an explanatory diagram showing the ArF excimer laser according to a third embodiment.
Figure 7:
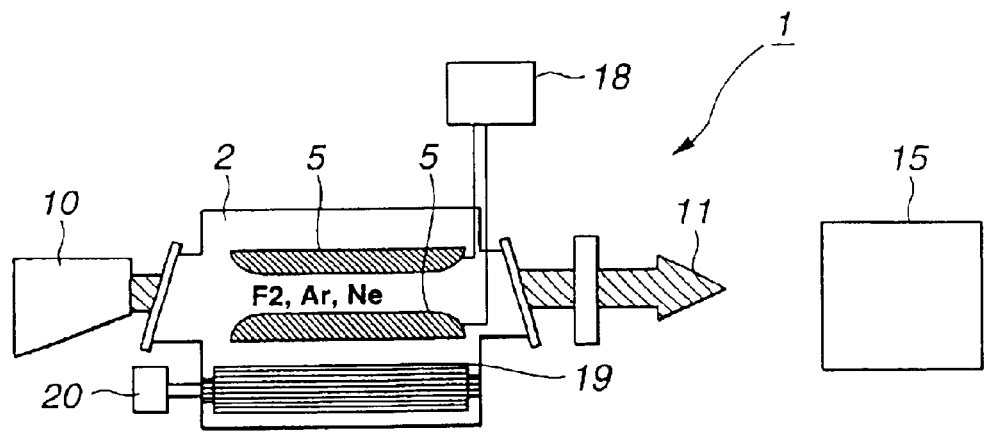
FIG. 7 is a diagram showing a structure of the ArF excimer laser according to prior art.
Figure 8:
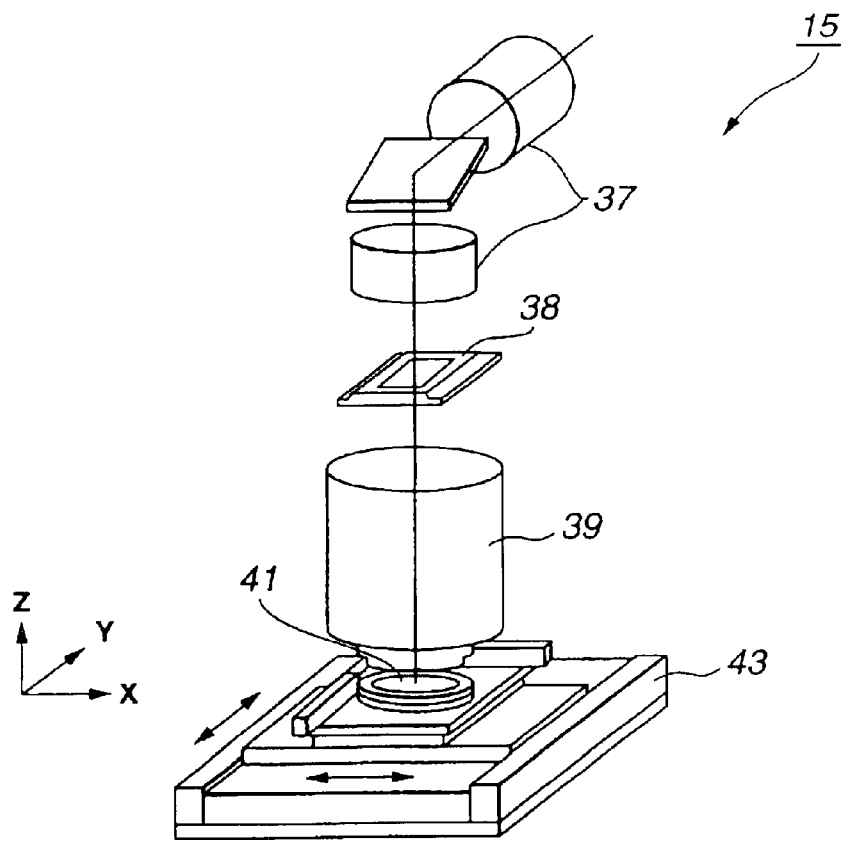
FIG. 8 is an explanatory diagram of a stepper.

Now, a third embodiment will be described. FIG. 6 shows a structure of the ArF excimer laser 1 of this embodiment. This ArF excimer laser 1 is a type called the injection lock (injection synchronization type) laser, and its details are described in, for example, a report in a meeting of The Laser Society of Japan, RTM-98-36, pp. 29 to 34.

The ArF excimer laser 1 has seed laser 47 which makes pulse oscillation of narrow-banded seed light 48 and ArF oscillator 52 which amplifies the seed light 48. The seed laser 47 preferably has, for example, a solid laser subjected to the conversion of a wavelength by a wavelength conversion element and oscillates the seed light 48 having a wavelength of 193 nm and a spectrum width of less than 1 pm. Otherwise, a small narrow-banded ArF excimer laser may be used.

The ArF oscillator 52 has laser chamber 2 which encloses a laser gas, windows 7, 9 which are disposed on both sides of the laser chamber 2 at a Brewster angle with respect to the optical axis, pored concave mirror 50 which is disposed outside of the rear of the window 9 and has a small hole 49 at about the center, and convex mirror 51 which is disposed outside of the front of the window 7.

And, discharging electrodes 5, 5 are disposed at predetermined positions in the laser chamber 2, and a high voltage can be applied by an unshown high-voltage power supply. Flowing fan 19 which is rotated by motor 20 is disposed in the chamber 2 to circulate the laser gas in the chamber 2 so to lead it to between the discharging electrodes 5 and 5. In addition, $F_2$, Ar and He are enclosed as the laser gas in the laser chamber 2 in the same way as in the first and second embodiments. It is more preferable to enclose Xe in the gas chamber 2.

In the same drawing, the seed light 48 which is oscillated from the seed laser 47 and has, for example, a wavelength of 193 nm and a spectrum width of 0.5 pm is entered the ArF oscillator 52 through the small hole 49 of the pored concave mirror 50 and the window 9. And, the seed light 48 is reflected by the convex mirror 51 and then reflected by the pored concave mirror 50, and it is emitted as the laser light 11 having a doughnut cross section from around the convex mirror 51.

While passing through the laser chamber 2, the seed light 48 is amplified its pulse output with the wavelength of 193 nm and the spectrum width of 0.5 pm unchanged by the electric discharge applied from the unshown high-voltage power supply to between the discharging electrodes 5 and 5.

Thus, the flow velocity of the laser gas between the discharging electrodes 5 and 5 can be increased in the ArF excimer laser 1 of the injection lock type according to this embodiment by using He as the buffer gas. Therefore, the laser light 11 can be oscillated at a high pulse frequency because the deteriorated laser gas can be removed from between the discharging electrodes 5 and 5 even if the electric discharge is performed at a high pulse frequency. Besides, the pulse output can be kept at a high value by adding Xe.

And, the injection lock type ArF excimer laser 1 is also usable as the light source for the scanning type exposure device 40 in the same way as the laser of the type described in the first and second embodiments.

Besides, the laser of the type described in the first and second embodiments may have the spectrum width increased by using He as the buffer gas, while the injection lock type laser does not have such a situation and can perform appropriate exposure because a good spectrum width can always be obtained.

Now, preferred embodiments of the ultraviolet laser device according to the fourth aspect of the invention will be described in detail. In the description below, the invention is applied to an excimer laser device.

Figure 9:
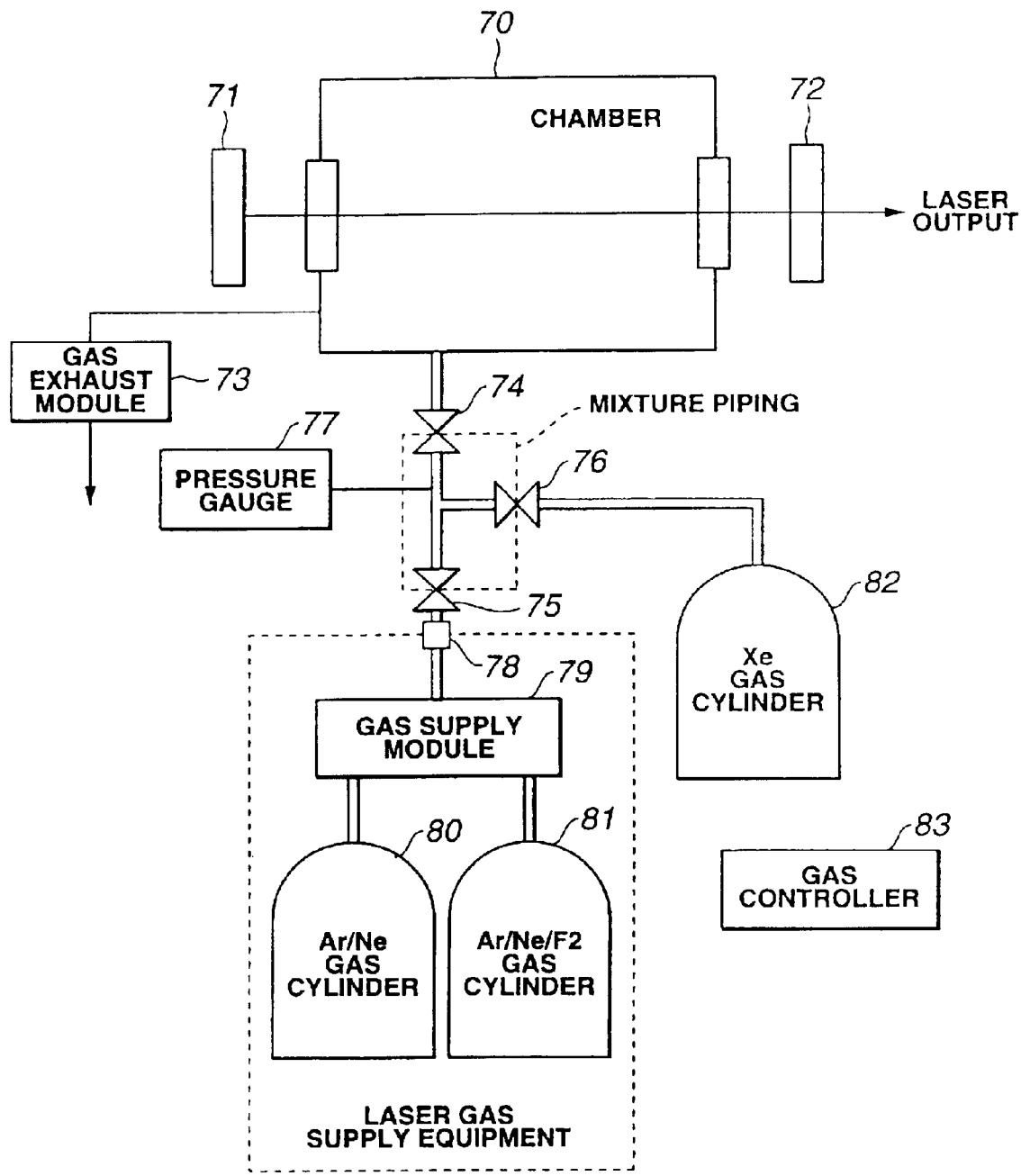
FIG. 9 is a block diagram showing a structure of the excimer laser device according to a fourth embodiment.

FIG. 9 is a block diagram showing the overall structure of the excimer laser device used in a first embodiment.

The excimer laser device shown in this figure is a device which adds a trace quantity of xenon (Xe) gas to the gas for the excimer laser which consists of buffer gas such as Ne, rare gas such as Ar or Kr and halogen gas such as $F_2$, seals the excimer laser gas into chamber 70, and excites the excimer laser gas between discharging electrodes by the electrical discharge (not shown). The xenon gas is introduced into the chamber 70 other than the introduction of the excimer laser gas, because the presence of the xenon gas improves the burst and spike characteristics of the excimer laser output.

The excimer laser device has a feature that it does not have Xe gas cylinder 82 directly connected to the chamber 70 but has the Xe gas cylinder 82 connected to valve 76 of piping (called "mixture piping") divided by three valves 74 to 76 (i.e., first to third valves respectively).

Specifically, it is conventional to install the laser gas supply equipment on the site, and modification of the laser gas supply equipment in order to supply the excimer gas from the Xe gas cylinder 82 to the chamber 70 is not efficient because the existing equipment must be greatly modified. Especially, the substantial modification of the gas supply equipment at a site (e.g., a clean room where a semiconductor wafer exposure stepper is installed) where optical processing is performed by means of the laser for the purpose of merely adding xenon gas is not realistic because some laser devices do not require the addition of xenon gas.

Therefore, this embodiment enables to introduce xenon gas into the chamber 70 without involving the modification of the laser gas supply equipment and without increasing the number of piping connected to the chamber 70.

In a case of ArF excimer laser for example, the excimer laser device shown in FIG. 9 comprises the chamber 70, narrow-banding unit 71, partial penetration mirror 72, gas exhaust module 73, valves 74 to 76, pressure gauge 77, piping joint 78, gas charge module 79, Ar/Ne mixture gas cylinder 80, Ar/Ne/$F_2$ mixture gas cylinder 81, Xe gas cylinder 82 and gas controller 83.

The chamber 70 is a sealing medium for sealing the excimer laser gas consisting of Ne gas, Ar gas and $F_2$ gas with a trace quantity of xenon gas added, and the narrow-banding unit 71 is a unit for narrow-banding of the emitted pulse light and formed by unillustrated prism beam expander and grating. And, the partial penetration mirror 72 is a mirror which penetratingly outputs only a part of the oscillation laser and returns the other part into the chamber 70.

The gas exhaust module 73 is a module for externally exhausting the gas from the chamber 70, and the valves 74 to 76 are mounted on the piping from the chamber 70 to each gas cylinder.

The pressure gauge 77 is a measuring device for measuring a pressure in the mixture piping divided by the valves 74 to 76 and that in the chamber 70, and the piping joint 78 is a coupler for connecting the laser gas supply equipment with the piping to the chamber 70.

The gas supply module 79 is a module for controlling an amount of the Ar/Ne gas supplied from the Ar/Ne mixture gas cylinder 80 and the Ar/Ne/$F_2$ gas from the Ar/Ne/$F_2$ mixture gas cylinder 81 to the piping. He may be used instead of Ne.

The Ar/Ne mixture gas cylinder 80 is a gas cylinder for storing a mixture gas of argon and neon. The Ar/Ne/$F_2$ mixture gas cylinder 81 is a gas cylinder for storing a mixture gas of argon, neon and fluorine. The Xe gas cylinder 82 is a small gas cylinder for storing xenon gas.

The gas controller 83 is a control unit for controlling the exhaust by the gas exhaust module 73 and for controlling the opening and closing of the valves 74 to 76.

Thus, in the excimer laser device, the Xe gas cylinder 82 is connected to the mixture piping so to add a trace quantity of xenon gas to the excimer laser gas by controlling the gas exhaust module 73 and the valves 74 to 76 by means of the gas controller 83.

Control procedures of the gas exhaust module 73 and the valves 74 to 76 by the gas controller 83 shown in FIG. 9 will be described.

Figure 10:
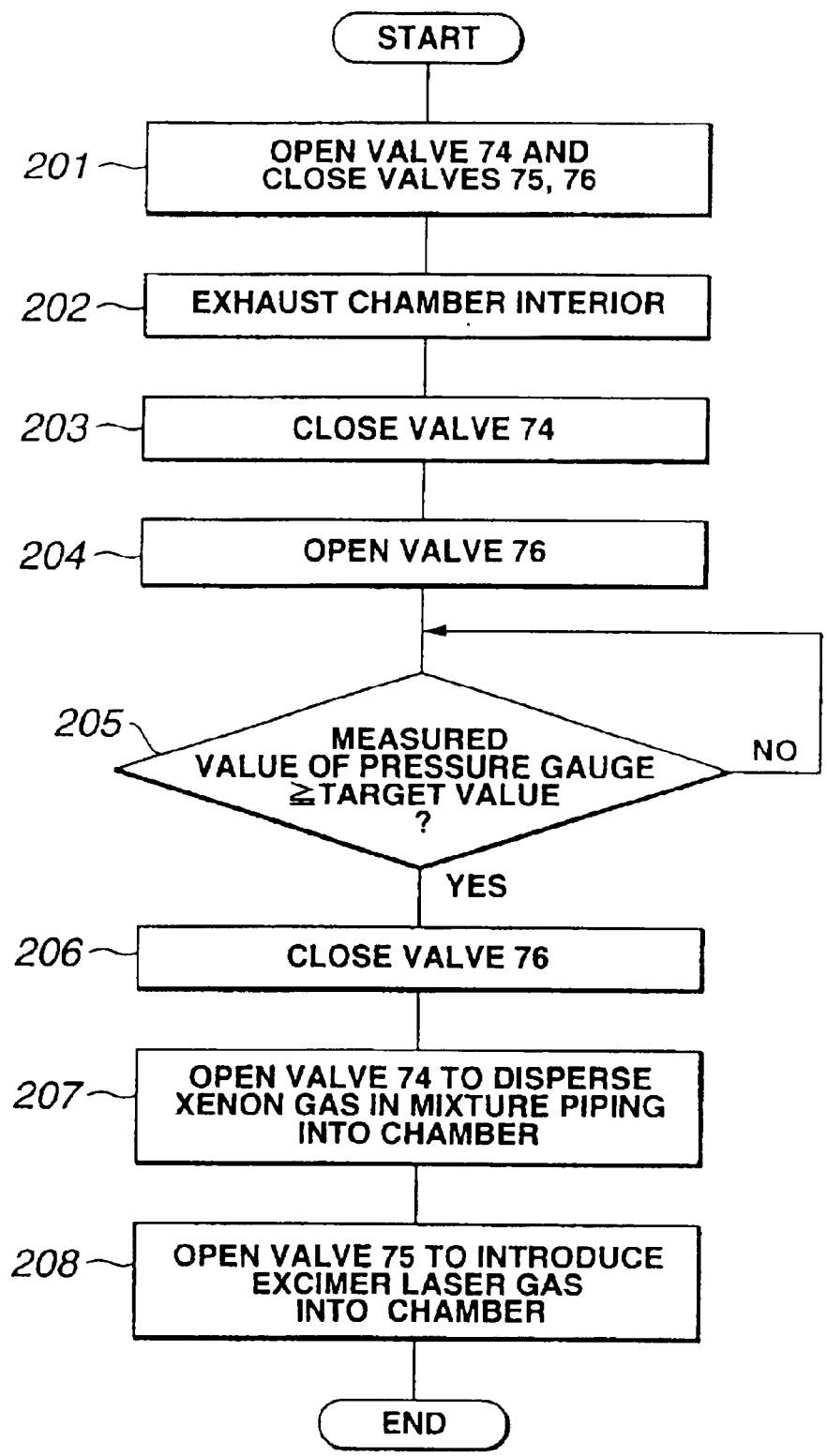
FIG. 10 is a flow chart showing a control procedure of the gas controller shown in FIG. 9.

FIG. 10 is a flow chart showing the control procedures of the gas exhaust module 73 and the valves 74 to 76 by the gas controller 83 shown in FIG. 9.

It is seen that the gas controller 83 opens the valve 74, closes the valves 75 and 76 (step 201) and exhausts the chamber 70 by the gas exhaust module 73 (step 202).

Exhaust by the gas exhaust module 73 exhausts the gas from the chamber 70 and also from the mixture piping, so that the interiors of the chamber 70 and the mixture piping become to have a near-vacuum state.

The valve 74 is closed and the valve 76 is opened (steps 203 and 204), then the xenon gas flows from the Xe gas cylinder 82 into the mixture piping owing to the gas pressure in the Xe gas cylinder 82 and the vacuum in the mixture piping.

Then, the gas pressure in the mixture piping is measured by the pressure gauge 77, and when the measured value indicated by the pressure gauge 77 becomes a predetermined target value or higher (step 205), the valve 76 is closed to stop supplying the xenon gas (step 206).

In the aforesaid condition, the valve 74 is opened to introduce the xenon gas from the mixture piping into the chamber 70 owing to the vacuum in the chamber 70, and the xenon gas is dispersed into the chamber 70 (step 207).

Then, the valve 75 is opened to introduce the excimer laser gas supplied from the gas supply module 79 into the chamber 70 (step 205), so that the dispersed xenon gas is added to the excimer laser gas.

As described above, this embodiment is configured that the mixture piping divided by the valves 74 to 76 is disposed on the piping running from the chamber 70 to the excimer laser gas cylinders 80 and 81, the mixture piping is connected with the Xe gas cylinder 82, the gas exhaust by the gas exhaust module 73 and the opening and closing of the valves 74 to 76 are controlled by the gas controller 83 to add a trace quantity of xenon gas to the excimer laser gas. Thus, the trace quantity of xenon gas can be added efficiently to the excimer laser gas without modifying the structures of the existing laser gas supply equipment and the chamber.

What is claimed is:

1. A laser gas for an ArF excimer laser, which contains a halogen gas, a rare gas and a buffer gas, and which is sealed in a chamber of the ArF excimer laser, wherein the laser gas contains about 1 to 100 ppm of Xe other than the rare gas for improving and stabilizing a laser output, and the buffer gas mainly consists of He.

2. An ArF excimer laser, comprising:
   a laser gas containing a halogen gas, a rare gas, a buffer gas and about 1 to 100 ppm of Xe other than the rare gas for improving and stabilizing a laser output, the buffer gas mainly consisting of He;
   a chamber for sealing the laser gas;
   a pair of discharging electrodes disposed to oppose each other in the chamber, for exciting the laser gas by electric discharges;
   a fan for circulating the laser gas in the chamber to guide the laser gas between the pair of discharging electrodes; and
   an optical resonator for oscillating via the chamber a laser light generated by the electric discharges across the pair of discharging electrodes and band-narrowing the laser light.

3. The ArF excimer laser according to claim 2, wherein, a laser light having a high pulse frequency is obtained by making a rotational speed of a fan higher, by the laser gas, than a case where the buffer gas is Ne.

4. A scanning type exposure system, comprising:
   an ArF excimer laser which seals in a chamber a laser gas which contains a halogen gas, a rare gas, about 1 to 100 ppm of Xe other than the rare gas, and a buffer gas mainly consisting of He and which outputs a pulsed laser light; and
   a scanning type exposure device which performs exposure of an entire semiconductor chip on a wafer by moving the wafer while irradiating the pulsed laser light from the ArF excimer laser to each of a plurality of irradiation regions smaller than an area of the semiconductor chip.

5. An ultraviolet laser gas supply device which supplies a gas for ultraviolet laser containing a buffer gas, a halogen gas and a rare gas into a chamber of an ultraviolet laser device, and which adds 1 to 100 ppm of xenon gas to the gas for ultraviolet laser, comprising:
   an ultraviolet laser gas cylinder in which the gas for ultraviolet laser is sealed;
   a xenon gas cylinder in which the xenon gas is sealed;
   a first piping having a first and second ends, and first valve and a second valves arranged between the first and second ends of the first piping, the first end of the first piping communicating with the chamber and the second end of the first piping communicating with the ultraviolet laser gas cylinder;
   a second piping having first and second ends and a third valve, the first end of the second piping communicating with the first piping between the first and second valves of the first piping, and the second end of the second piping communicating with the xenon gas cylinder; and
   a pressure gauge for measuring a gas pressure within the first piping and the second piping that are sectioned by the first valve, the second valve and the third valve.

6. An ultraviolet laser gas supplying method for supplying a gas for ultraviolet laser containing a buffer gas, a halogen gas and a rare gas into a chamber of an ultraviolet laser device, and adding 1 to 100 ppm of xenon gas to the gas for ultraviolet laser, comprising the steps of:
   using an ultraviolet laser gas supply device including: an ultraviolet laser gas cylinder in which the gas for ultraviolet laser is sealed; a xenon gas cylinder in which the xenon gas is sealed; a first piping having a first and second ends, and first valve and a second valves arranged between the first and second ends of the first piping, the first end of the first piping communicating with the chamber and the second end of the first piping communicating with the ultraviolet laser gas cylinder; a second piping having first and second ends and a third valve, the first end of the second piping communicating with the first piping between the first and second valves of the first piping, and the second end of the second piping communicating with the xenon gas cylinder; and a pressure gauge for measuring a gas pressure within a mixture piping that is sectioned by the first valve, the second valve and the third valve, exhausting the laser gas in the chamber in a state that the second valve and the third valve are closed and the first valve is opened;

supplying the xenon gas into the mixture piping in a state that the first valve and the second valve are closed and the third valve is opened; and when a measure value of the pressure gauge has reached a predetermined gas pressure, supplying the xenon gas in the mixture piping and the ultraviolet laser gas in the ultraviolet laser gas cylinder into the chamber in a state that the third valve is closed and the first valve and the second valve are opened.

* * * * *